United States Patent
Den Boer

[11] 3,904,165
[45] Sept. 9, 1975

[54] MOLDING APPARATUS FOR SAFETY CAPS

[75] Inventor: Cornelis Gerardus Den Boer, Windsor, Canada

[73] Assignee: International Tools, Windsor, Canada

[22] Filed: Apr. 29, 1974

[21] Appl. No.: 465,210

[52] U.S. Cl. .................. 249/67; 425/242; 249/142; 425/438; 425/444
[51] Int. Cl.² ..... B29C 1/00; B29C 7/00; B29F 1/14
[58] Field of Search ...... 425/242, 247, 249; 249/59, 249/142, 66, 67, 75; 18/42 D UX

[56] References Cited
UNITED STATES PATENTS

| | | | |
|---|---|---|---|
| 2,808,620 | 10/1957 | Schmid et al. | 249/59 X |
| 3,013,308 | 12/1961 | Armour | 425/242 X |
| 3,344,942 | 10/1967 | Hedgewick | 425/242 X |
| 3,481,000 | 12/1969 | Barfuss | 249/59 UX |
| 3,555,606 | 1/1971 | Hedgewick | 425/242 |
| 3,660,001 | 5/1972 | Roehr | 249/59 UX |

Primary Examiner—J. Howard Flint, Jr.
Attorney, Agent, or Firm—Reising, Ethington, Barnard, Perry & Brooks

[57] ABSTRACT

Molding apparatus for molding a one piece plastic safety cap, the cap being of the type that is applied to and removed from the container by an axial motion of the cap with respect to the container followed successively by a rotative motion of the cap relative to the container. The molding apparatus includes a first mold portion with a cavity for defining the outer surface of the base and outer surface of the peripheral flange of the cap. A second mold portion projects into the cavity for defining the inner surfaces of the base and flange, and is formed with open ended notches for defining the inwardly projecting locking lugs on the flange of the cap. Lug forming elements project radially inwardly from the side surface of the cavity and depend from the end surface of the cavity, each of the lug forming elements projecting into one of the notches of the second mold portion. The bottom surface of the lug forming elements are spaced from the bottoms of the respective notches and define the upper surfaces of the respective cap lugs. The second mold portion includes a plurality of core members which cooperate to define an annular slot for defining an axially extending flexible web for the cap. The core members are separable from each other to release the web from confinement. When the first mold portion is removed from the second mold portion, and the core members are separated from each other, a third mold portion strips the cap from the remaining core member.

11 Claims, 6 Drawing Figures

MOLDING APPARATUS FOR SAFETY CAPS

This invention relates generally to molding apparatus for molding plastic articles, and is particularly concerned with molding apparatus for molding one piece plastic safety caps of the type having a base and a peripheral flange extending axially therefrom with inwardly projecting locking lugs on the peripheral flange for engagement with locking elements of the container to which the cap is to applied.

Hedgewick U.S. Pat. No. 3,344,942 dated Oct. 3, 1967 discloses a one piece plastic safety cap of the type that is applied to and removed from a container by axial movement of the cap relative to the container followed by rotative movement of the cap relative to the container to respectively engage and disengage inwardly projecting locking lugs on the flange of the cap from locking elements on the container to which the cap is applied. In order to resiliently bias the locking lugs of such caps into engagement with the container locking elements, the cap disclosed in the latter Hedgewick Patent further includes a resilient annular web projecting radially and axially from the inner surface of the base of the cap for engagement with the container. It is difficult for a young child to perform the type of manipulation required to remove such caps from the containers, and consequently, such caps are generally referred to as "Child-Proof Caps" or "Safety Caps". Other caps of this general type are disclosed in U.S. Pat. Nos. 3,608,764; 3,623,623 and 3,753,510.

In order to obtain a secure lock between safety caps of the types discussed above and the containers to which the safety caps are applied, it is essential that the locking lugs on the caps be accurately formed, particularly the upper surfaces which engage the opposed surfaces of the grooves in the container locking elements to prevent axial separation of the cap with respect to the container. Hedgewick U.S. Pat. No. 3,482,814 discloses molding apparatus for making safety caps wherein the upper surfaces of the cap locking lugs are formed by pins which project from a cavity insert of the mold through the space defining the base of the cap and into the space which defines the flange of the cap. The lower ends of the pin members define the upper surfaces of the locking lugs of the cap. A problem has occurred with the molding apparatus disclosed in U.S. Pat. No. 3,482,814 in that the pin members are subject to frequent breakage.

An object of this invention is to provide molding apparatus for molding safety caps in which the lug forming elements are formed in the cavity member of the mold in such a manner as to have high strength to significantly reduce the problem of breakage of the lug forming elements.

In carrying out the foregoing, and other objects, molding apparatus according to the present invention includes a first mold portion having a cavity with an end surface for defining the outer surface of the base of a safety cap and a side surface extending from the periphery of the end surface for defining the outer surface of the peripheral flange of the safety cap. Projecting radially inwardly from the side surface of the cavity and depending integrally from the end surface of the cavity is a plurality of lug forming elements, one for each lug to be formed on the safety cap. The molding apparatus further includes a second mold portion that projects into the cavity and has an upper surface for defining the inner surface of the base of the safety cap, and an outer surface for defining the inner surface of the peripheral flange of the cap, and a plurality of notches equal in number to the lug forming elements recessed in the outer surface for defining the locking lugs. Each of the notches receives one of the lug forming elements, and the bottom surfaces of the lug forming elements are spaced from the bottom surfaces of the respective notches to define the upper surfaces of the lugs. A third mold portion includes a stripper ring which engages the free end of the flange of the cap and moves axially relative to the second mold portion after the first mold portion has been separated therefrom to strip the cap from the second mold portion.

The second mold portion further includes an annular slot for defining a flexible annular web on the cap. The second mold portion includes a pair of core members axially movable relative to each other. One of the core members is formed with an annular upper surface with an annular inclined surface defining one surface of the annular slot, and the other core member has an upper surface for defining the remaining portion of the inner surface of the base, and an annular inclined surface for defining the other surface of the annular slot. The free end of the peripheral flange of the cap is defined in part by the stripper ring which is axially slidable relative to the first core member. When the core members are separated to release the web from confinement between the inclined surfaces of the annular slots subsequent to a molding operation, the stripper ring moves axially relative to the core members to force the lugs out of the notches and flexibly distort the web to remove it from the outer core member.

Other objects, advantages and features of the invention will become apparent from the following description taken in connection with the accompanying drawings in which.

Figure 2:
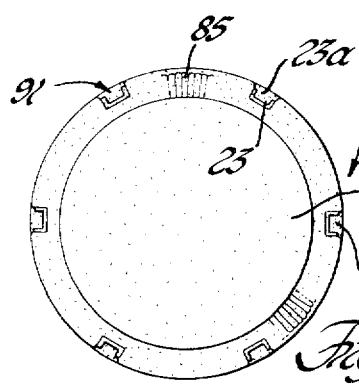
FIG. 2 is a top view of a child proof safety cap made by the molding apparatus of FIG. 1.
Figure 3:
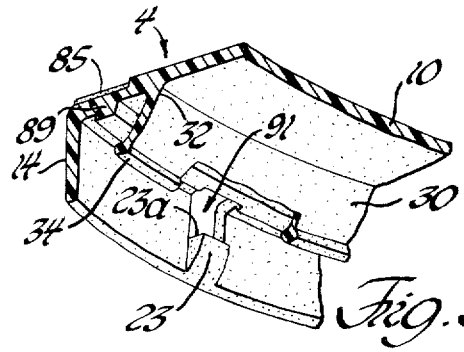
FIG. 3 is a perspective view of a fragment of the safety cap of FIG. 2.
Figure 5:
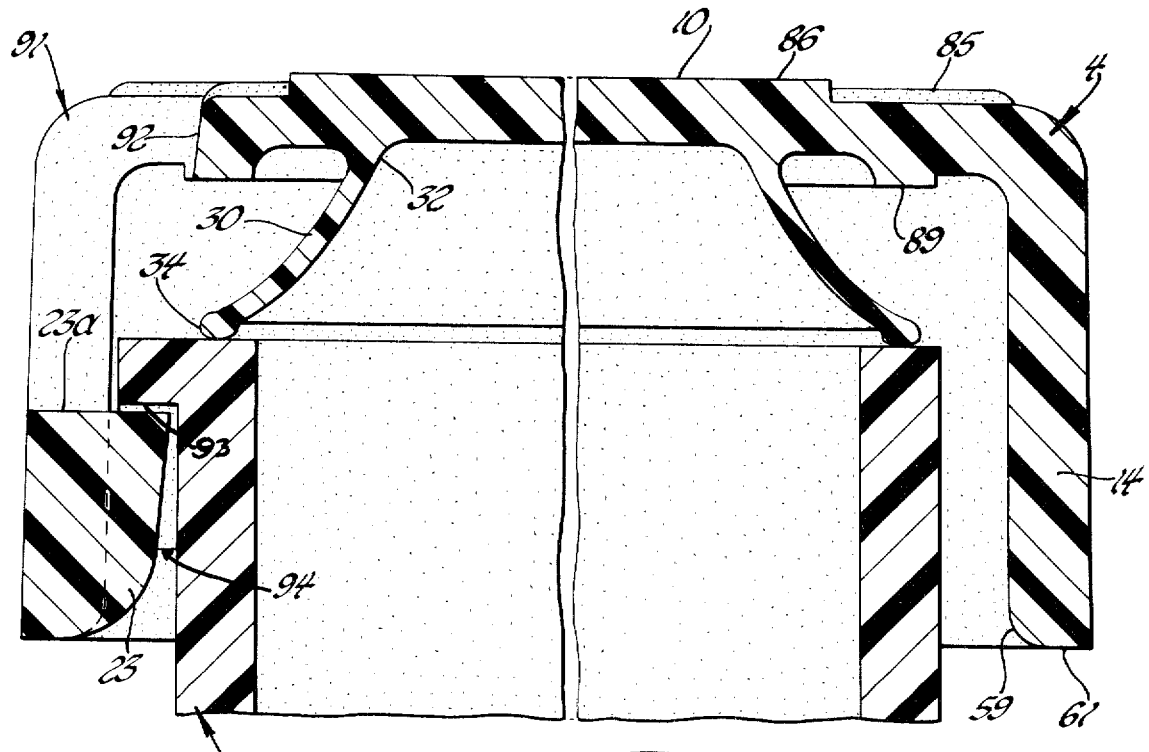
FIG. 5 is a sectional view of the safety cap of FIGS. 2 and 3 together with a container of the type with which the safety cap is adapted to be used.

In the drawings, reference numeral 2 collectively designates molding apparatus for molding a one piece safety cap, the cap being designated generally by reference numeral 4 in FIGS. 2, 3 and 5 of the drawings. The molding apparatus 2 includes a first mold portion 6 having a cavity formed therein with an end surface 8 for defining the outer surface of the base 10 of the cap 4, and a side surface 12 extending axially from the periphery of the end surface 8 for defining the outer surface of the flange 14 of the cap, which flange extends axially from the base 10.

Figure 4:
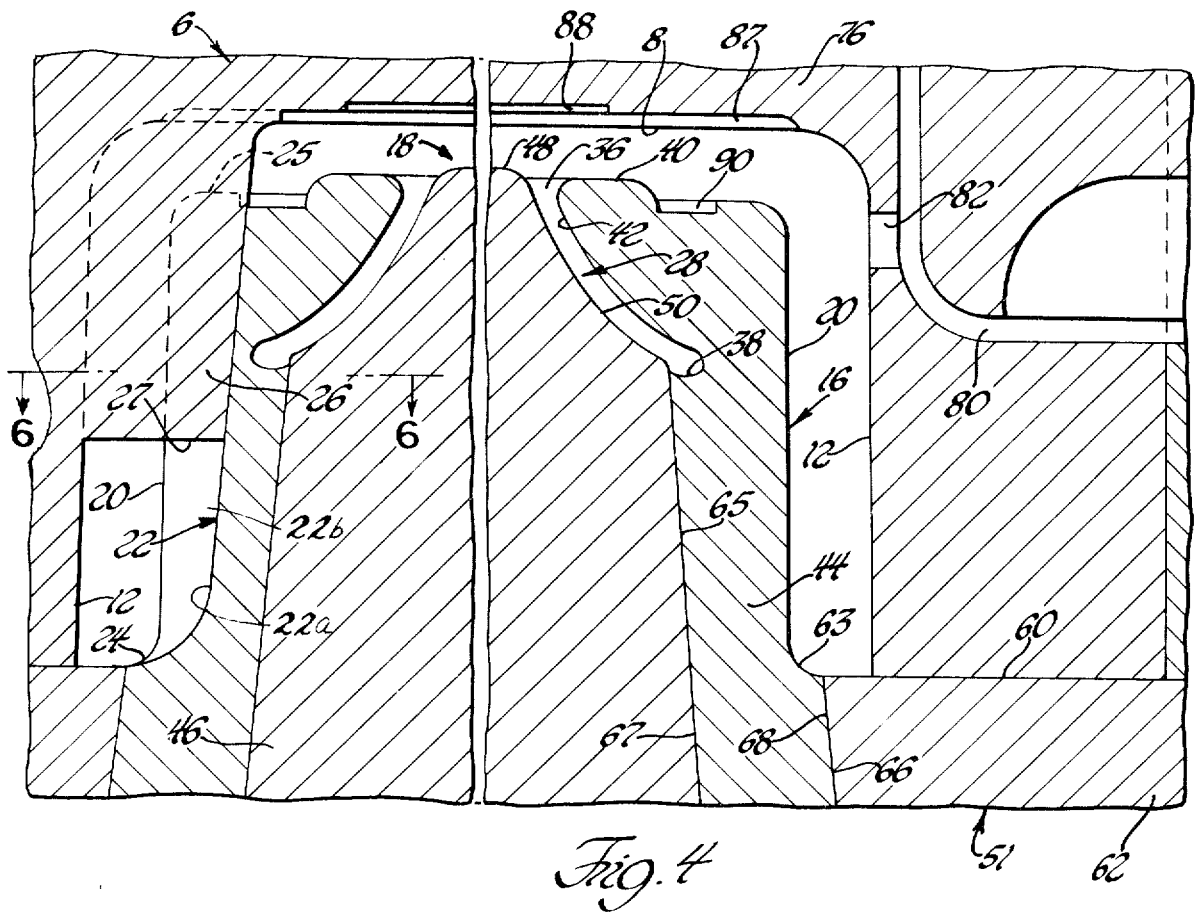
FIG. 4 is an enlarged view of a portion of the molding apparatus of FIG. 1.
Figure 6:
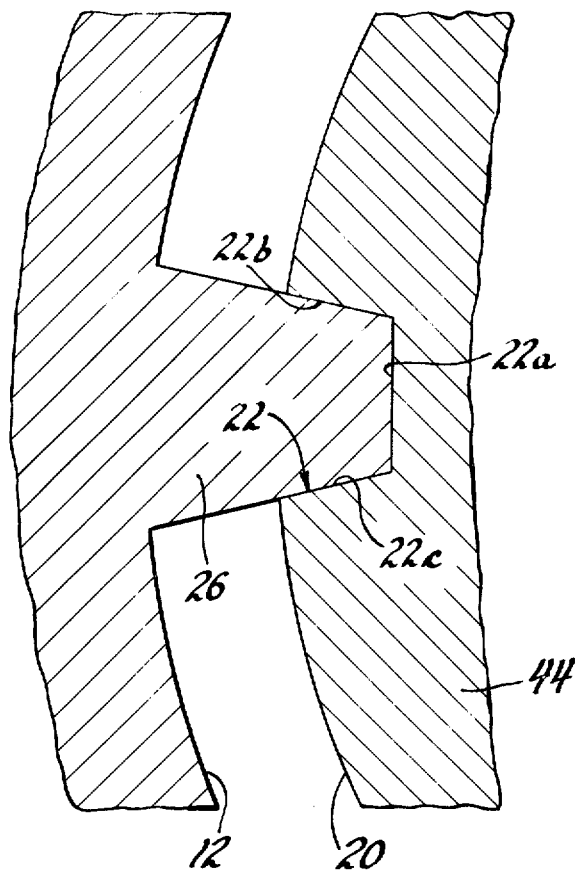
FIG. 6 is a fragmentary sectional view taken on lines 6—6 of FIG. 4.

The molding apparatus 2 further includes a second mold portion 16 having an upper surface designated generally by reference numeral 18. Surface 18 is spaced from and cooperates with the end surface 8 of the cavity of the first mold portion 6 to define the inner surface of the base 10 of cap 4. The second mold portion 16 further includes an outer surface 20 spaced from and cooperating with the side surface 12 of the cavity of the first mold portion 6 to define the inner surface of the peripheral flange 14 of the cap. Recessed in the outer surface 20 of the second mold portion 16 is a plurality of notches 22 for defining inwardly projecting locking lugs 23 on the flange of the cap. Each of the notches 22 has an open end 25 at the upper surface 18 and a bottom surface 24. Each notch 22 has side walls or surfaces 22b and 22c (FIGS. 4 and 6) and an inner surface 22a connecting surfaces 22b and 22c, the inner surface 22a being spaced from the outer surface 20 of the second mold portion. Projecting radially inwardly from the side surface 12 of the cavity and depending integrally from the end surface 8 of the cavity is a plurality of lug forming elements 26, equal in number to the number of notches 22, and hence to the number of lugs 23 to be formed on the cap 4. Each of the lug forming elements 26 has a bottom surface 27 which is spaced from the bottom surface 24 of the respective notch 22 for defining the upper surface 23a of the lugs 23. The lugs 23 otherwise conform to the configuration of the the portion of the notch 22 located beneath the bottom surface 27 of the lug forming element 26 as shown in FIG. 4.

The cap 4, as illustrated in FIG. 2, has six locking lugs 23. Consequently, in the illustrated mold apparatus, there are six notches 22 on the second mold portion 16, and hence six lug forming elements 26 on the first mold portion 6 for cooperating with the respective notches 22. The lug forming elements 26 are integral with both the side and end surfaces 12 and 8, respectively, of the cavity of the first mold portion 6, and are consequently of high strength construction as opposed to pins projecting solely from the end surface 8 of the cavity.

Formed in the second mold portion 16 is an annular slot 28 for defining an axially extending annular flexible web 30 for the cap 4. The annular flexible web 30 of the cap has an inner annular end 32 joined integrally to the inner surface of base 10 and an outer annular free end 34 which is spaced axially from the base 10. Consequently, the annular slot 28 has an inner end 36 at the upper surface 18 of the second mold portion 16 and an outer end 38 spaced axially from the upper surface 18 of the second mold portion 16. The outer end 38 of slot 28 is of a different diameter than the inner end 36, and consequently, one portion 40 of the upper surface 18 defines an acute angle with one surface 42 of slot 28.

The second mold portion 16 includes a plurality of relatively movable core members. Specifically, the second mold portion 16 includes a first core member 44 which is formed with the portion 40 of the upper surface of the second mold portion and the annular inclined surface 42 of the slot 28. The second mold portion 16 further includes a second core member 46 formed with the second or remaining portion 48 of the upper surface 18 and a second annular inclined surface 50 defining the other surface of the annular slot 28.

In the illustrated embodiment, the outer end 38 of slot 28 is larger than the inner end 36 such that the annular inclined surface 42 of the first core member 44 extends axially and radially outwardly from the first portion 40 of the upper surface 18, and the portion 40 of the upper surface extends radially inwardly from the upper edge of the outer surface 20 which is formed on the first core member 44.

As shown in the drawing, the first core member 44 is of annular cross section and is slidably mounted on the second core member for movement with respect thereto between a molding position shown in the drawing for molding a cap, and an open position for releasing the web 30 of the cap 4 from confinement between the annular inclined surfaces 42 and 50 of the first and second core members 44 and 46, respectively. Releasing the web thusly permits the cap 4 to be stripped from the first core member 44 by flexible distorting the web 30 to remove it from the annular inclined surface 42 of the first core member 44.

The molding apparatus 2 further includes a third mold portion or stripper means 51 operable in a manner described below to strip a cap from the second mold portion subsequent to separation of the first mold portion therefrom by axially removing the cap 4 from the core member 44 of the second mold portion 16.

The molding apparatus 2 further includes a base member 52, and the second core member 46 is seated on the base member 52 and is secured against axial movement with respect to the base member 52 by retainer plate 54. The first core member 44 is seated on a plate 56, and a retainer plate 58 secures the second core member 44 against axial movement with respect to the plate 56. After completion of a molding operation, the first mold portion 6 is separated from the second mold portion 51, and the base plate 52 and retainer plate 54 are axially separated from plates 56 and 58. Consequently, the second core member 46 is displaced axially with respect to the first core member 44 to release the web 30 from confinement between surfaces 42 and 50 (FIG. 4) to permit the stripper means 51 to strip the cap from the core member 44.

The third mold portion or stripper means 51 is slidably mounted on the first core member 44 for axial movement from a molded position in which it is seated on the retainer plate 58. The stripper means 51 has a radially outwardly extending upper surface 60 which cooperates with the first mold portion 6 and the first core member 44 to define the outer portion 61 of the free edge of the flange 14 of the cap, the inner, curved portion 59 (FIG. 5) being formed by surface 63 (FIG. 4) at the lower end of the outer surface 20 of the core member 44. The engagement of surface 60 with the outer portion 61 of the free edge of the flange 14 of the cap causes the cap to be axially stripped from the second core member 44 when the stripper means 60 moves axially upwardly relative to core member 44 as viewed in FIG. 4.

Figure 1:
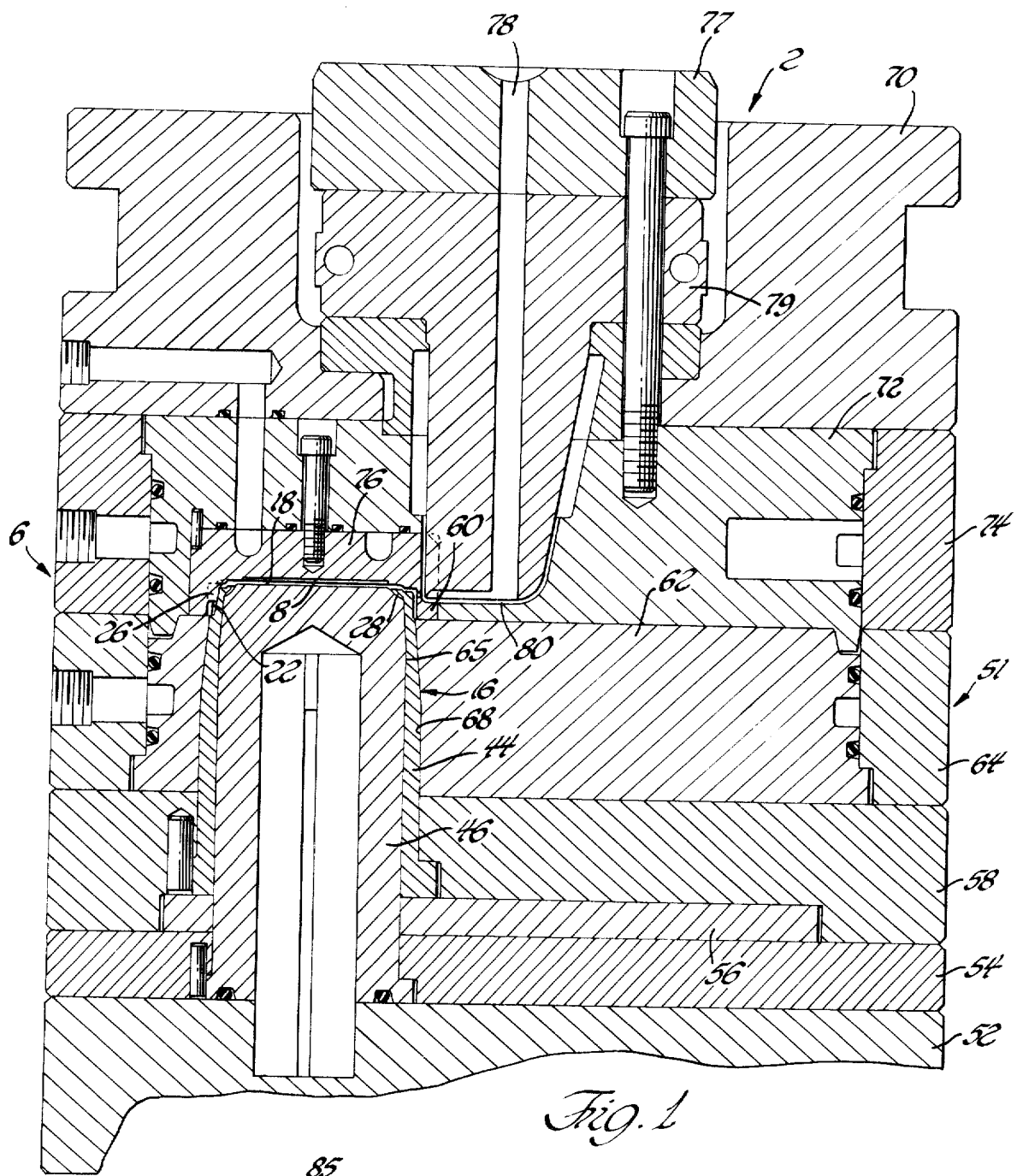
FIG. 1 is a sectional view of molding apparatus according to the invention.

The stripper means 51 includes a stripper ring 62 and a stripper plate 64 secured to the ring 62 at its periphery (FIG. 1). The second core member is formed with an upper, outer side wall 65 which is tapered outwardly from the lower end of the annular inclined surface 50. The first core member 44 has an upper, inner side wall 67 extending from the lower end of its annular inclined surface 42 which is tapered complementarily to side wall 65 of the second core member 46, and is engageable therewith in the molding position of the two core members. Additionally, the first core member 44 is formed with an upper, outer side wall 66 which is tapered outwardly as it extends from the lower end surface 63 of the outer surface 20, and the stripper means 51 has an upper, inner side wall 68 extending from its upper surface and tapered complementarily with respect to the side wall 66 of the first core member and is engageable therewith in the molding position.

As shown in FIG. 1, the first mold portion 6 includes a top cavity plate 70, a cavity retaining member 72, and a retaining member 74. The cavity retainer 72 is formed with a recess for receiving the cavity insert 76 in which the cavity having the end surface 8 and side surface 12 is formed. Plastic is injected through a passage 78 formed in members 77 and 79 which are mounted in a recess formed in the cover plate 70 and plate 72. Members 77 and 79 are part of a manifold system of a multiple cavity mold apparatus, the passage 78 communicating in turn with a passage 80 and port 82 (FIG. 4) into the cavity of the insert 76.

In the illustrated embodiment, the cap 4 is formed with alternating grooves and ribs 85 on the outer periphery of the base 10 (FIGS. 2, 3 and 5), which grooves and ribs surround an outwardly projecting central portion 86. The end surface 8 of the cavity in the insert 76 is thus formed with corresponding grooves and recesses 87, 88 for forming the ribs 85 and central portion 86, respectively. The cap is also formed with a depending annular rib 89 surrounding the web 30, and a corresponding groove 90 is formed in portion 40 of the upper surface 18 for forming the rib 89.

As shown in FIGS. 2, 3 and 5, the lug forming elements 26 of the cavity insert 76 cooperate with the core member 44 to define openings 91 in the cap 4. The openings 91 extend from the upper surfaces 23a of the locking lugs 23 on the flange 14 to the base 10 and extend inwardly from the juncture of the flange 14 with a base 10 to a surface 92 (FIG. 5) spaced slightly inwardly from the outer periphery of the rib 89. Consequently, the surface 23a is formed flat to provide a good locking engagement with surface 93 of the locking element formed on the container C in FIG. 5. The surface 93 is formed in a bayonet-type groove of a container locking element 94 of the type shown, for example, in Hedgewick U.S. Pat. No. 3,344,942.

While a specific form of the invention has been illustrated and described, it should be understood that the invention is not limited to the exact construction shown, but that various alterations and modifications in the construction and arrangement of parts will be possible without departing from the scope and spirit of the invention.

The embodiments of the invention in which an exclusive property or privilege is claimed are defined as follows:

1. Molding apparatus for molding a one-piece plastic cap comprising: a first mold portion having a cavity formed therein, said cavity having an end surface for defining the outer surface of a base of the cap, and a side surface extending from the periphery of said end surface for defining the outer surface of a peripheral flange of the cap; a second mold portion projecting into said cavity, said second mold portion having an upper surface spaced from and cooperating with said end surface to define the inner surface of the base of the cap, an outer surface spaced from and cooperating with said side surface to define the inner surface of the peripheral flange of the cap, and a plurality of notches recessed in said outer surface for defining inwardly projecting locking lugs on the peripheral flange of the cap, said notches each having an open end at said upper surface and an inner surface spaced from said outer surface of said second mold portion; and a plurality of lug forming elements, equal in number to said notches, projecting radially inwardly from the side surface of said cavity and depending from the end surface thereof, said lug forming elements each projecting past said outer surface of said second mold portion into one of said notches and having a lower end projecting from said side surface past said outer surface to the inner surface of said notch, said lower end being spaced from the lower end of the respective notch for defining the upper surface of one of said lugs, said lug forming elements each filling that portion of the respective notch between the open end thereof and the lower end of said lug forming element, said lug forming elements each having an upper end joined integrally to said end surface of said cavity and being joined integrally along its length with said side surface of said cavity.

2. Apparatus as claimed in claim 1 further including stripper means operable to axially strip a cap from said second mold portion when said first mold portion is separated therefrom.

3. Apparatus as claimed in claim 2 including an annular slot in said second mold portion depending from said upper surface for defining an axially extending annular web for the cap.

4. Apparatus as claimed in claim 3 wherein said annular slot has an inner end at said upper surface and an outer end spaced axially from said upper surface and of a different diameter than said inner end such that one portion of said upper surface defines an acute angle with one surface of said annular slot.

5. Apparatus as claimed in claim 4 wherein said second mold portion comprises a plurality of relatively movable core members.

6. Apparatus as claimed in claim 5 wherein said plurality of core members comprises a first core member formed with said one portion of said upper surface and an annular inclined surface defining said one surface of said annular slot; and a second core member formed with the remaining portion of said upper surface and an annular inclined surface defining the other surface of said annular slot.

7. Apparatus as claimed in claim 6 wherein said outer surface is formed on one of said first and second core members.

8. Apparatus as claimed in claim 7 wherein the outer end of said annular slot is larger than said inner end such that the annular inclined surface of said first core member extends axially and radially outwardly from said one portion of said upper surface, and said outer surface is formed on said core member.

9. Apparatus as claimed in claim 8 wherein said first core member is of annular cross-section and is slidably mounted on said second core member with respect thereto between a molding position for molding a cap and an open position for releasing the web of the cap from confinement between the annular inclined surfaces of said core members and permit the cap to be stripped from the first core member by distorting the web to remove it from the annular inclined surface of said first core member.

10. Apparatus as claimed in claim 9 wherein said stripper means is slidably mounted on said first core member and has a radially extending upper surface cooperating with said first mold portion to define a portion of the edge of the flange of the cap, whereby upon separation of said first mold portion from said second mold portion and axial separation of said second core member from said first core member subsequent to molding a cap, axial upward movement of the stripper means relative to said first core member strips the cap from said first core member.

11. Molding apparatus for molding a one-piece plastic cap having a base, a peripheral flange extending axially therefrom, a plurality of inwardly projecting lugs on the inner surface of said flange, and a flexible annular web surrounded by said flange and having an inner annular end integral with the inner surface of said base and an outer annular free end spaced axially of said base and of a different diameter than the inner end such that one portion of the inner surface of the base defines an acute angle with one surface of the web, said molding apparatus comprising: a first mold portion having a cavity formed therein, said cavity having an end surface for defining the outer surface of the base of the cap, a side surface extending from the periphery of the end surface for defining the outer surface of the flange of the cap, and a plurality of lug forming elements projecting radially inwardly from the side surface of said cavity and depending from the end surface thereof; a first core member having a first annular upper surface for defining that portion of the inner surface of the base located between said annular web and said flange, an outer surface extending axially from the outer edge of said upper surface for defining the inner surface of said flange, a plurality of notches equal in number to said lug forming elements recessed in said outer surface for defining said lugs, said notches each having an open end at said first annular upper surface and receiving one of said lug forming elements, said lug forming elements each having an upper end joined integrally to said end surface of said cavity and being joined integrally along its length with said side surface of said cavity, said lug forming elements each having a lower end projecting from said side surface of said cavity past said outer surface of said first core member, said lower end being spaced from the bottom of the respective notch for defining the upper surface of the lugs, said lug forming elements each filling that portion of the respective notch between the open end thereof and the lower end of said lug forming element, and said first core member further including a first annular inclined surface extending axially and radially outwardly from the inner edge of said first upper surface for defining the outer surface of said web; a second core member slidable in said first core member and having a second upper surface for defining that portion of the inner surface of the base surrounded by the web, and a second annular inclined surface extending axially and radially outwardly from the edge of said second upper surface to define the inner surface of said web; and a stripper ring slidably mounted on said first core member; said stripper ring having an upper surface for defining at least a portion of the free edge of said flange.

* * * * *